United States Patent [19]
Beck et al.

[11] 3,963,822
[45] June 15, 1976

[54] METHOD OF MOLDING ELECTRICAL LAMP SOCKETS

[75] Inventors: Henry T. Beck, Toronto; Rudolph Koehler, Willowdale, both of Canada

[73] Assignee: Noma Lites Canada Limited, Scarborough, Canada

[22] Filed: Sept. 12, 1969

[21] Appl. No.: 857,452

[52] U.S. Cl. .................................. 264/251; 29/629; 264/263; 264/272; 264/297
[51] Int. Cl.² .......................................... B29D 3/00
[58] Field of Search ........... 264/272, 263, 251, 297; 29/629

[56] References Cited
UNITED STATES PATENTS

| | | | |
|---|---|---|---|
| 2,605,317 | 7/1952 | Yiscione .......................... | 264/272 X |
| 2,700,206 | 1/1955 | Gilbert ............................. | 264/263 X |
| 3,251,023 | 5/1966 | Schick ............................... | 339/99 |
| 3,367,025 | 2/1968 | Doyle ............................... | 264/272 X |
| 3,389,461 | 6/1968 | Hardardt .......................... | 264/272 X |
| 3,431,092 | 3/1969 | Lehner .............................. | 264/272 X |
| 3,444,618 | 5/1969 | Sorlie ............................... | 264/272 X |
| 3,463,845 | 8/1969 | DePass et al. ..................... | 264/334 X |
| 3,473,219 | 10/1969 | Randar et al. ..................... | 29/629 X |

*Primary Examiner*—Jan H. Silbaugh

[57] ABSTRACT

Electrical lamp sockets are moulded on and around elongated mutually insulated conductors to which the socket contacts are connected before moulding; the contacts being firmly embedded in the socket material. A transfer turntable carries a plurality of supports for mounting the socket contacts in spaced relation thereon; each support being successively brought to a moulding station and co-operation with mould elements to form a mould for the socket. The conductors are entrained through the moulding station and impaled on points of the contacts at said station prior to fully closing the mould and injecting the moulding charge.

4 Claims, 10 Drawing Figures

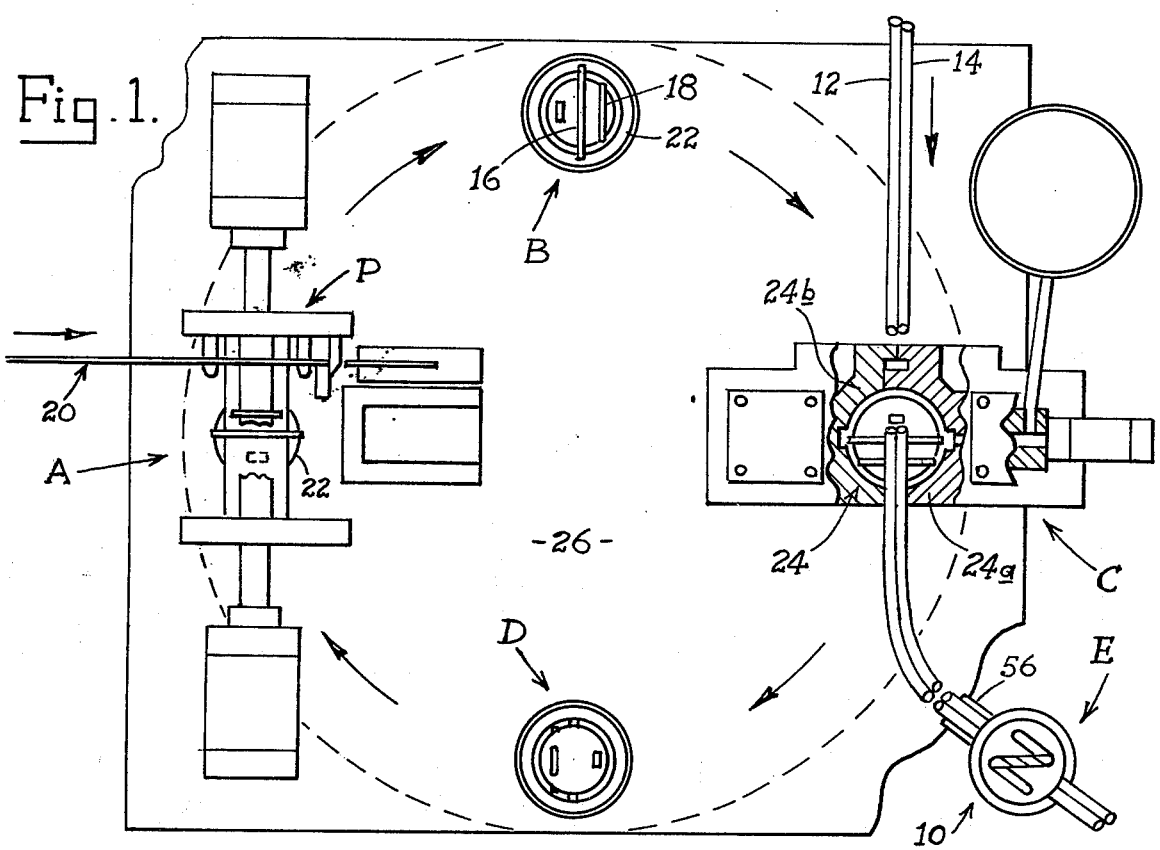
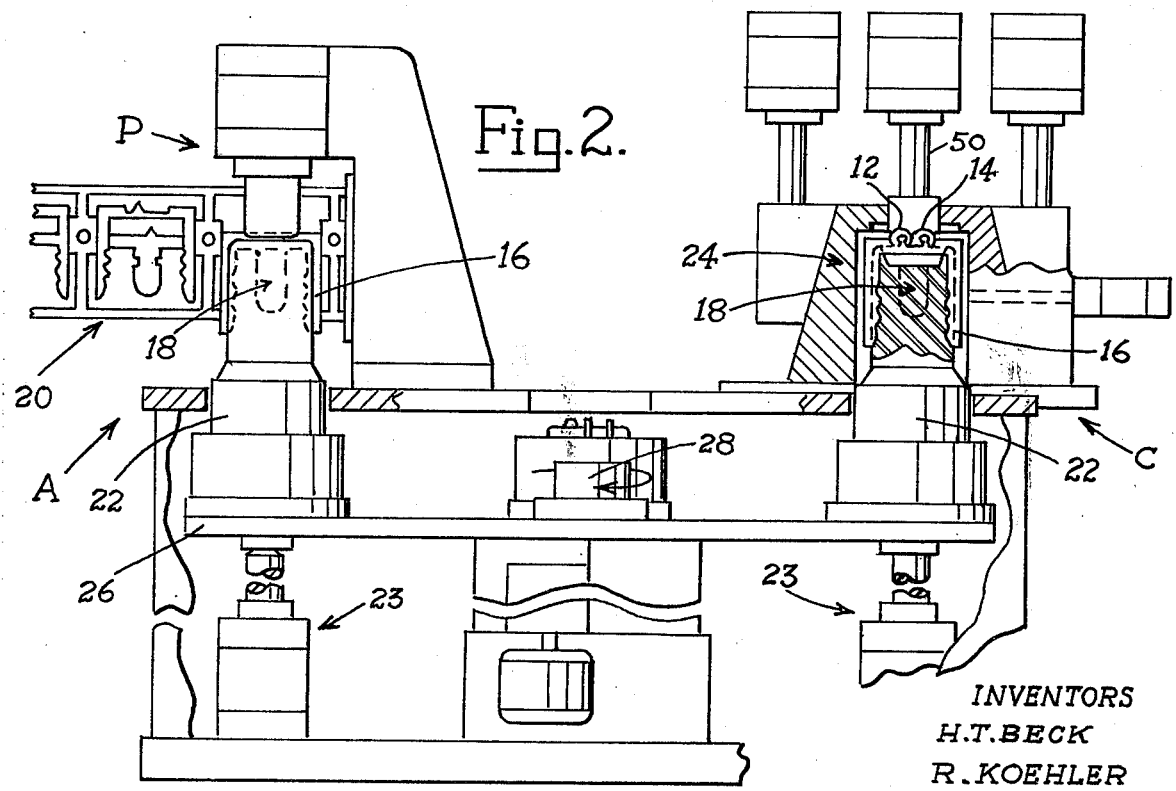

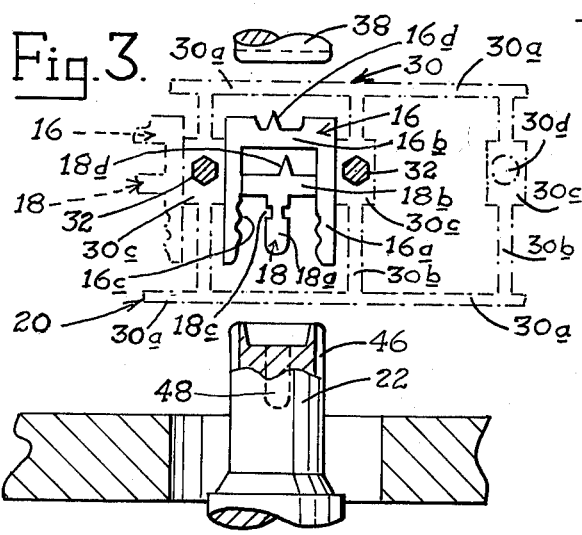
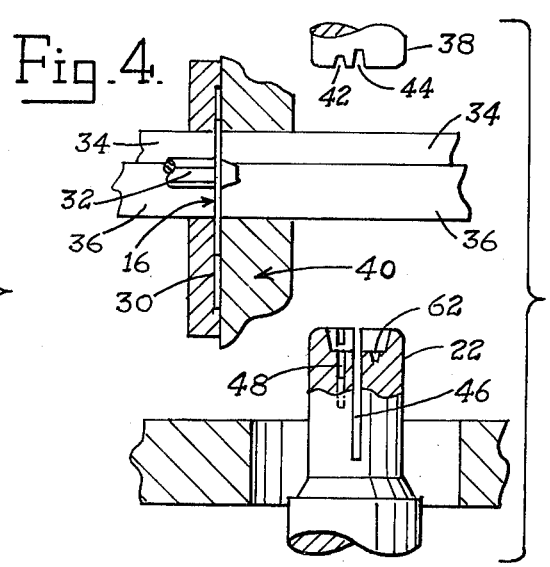
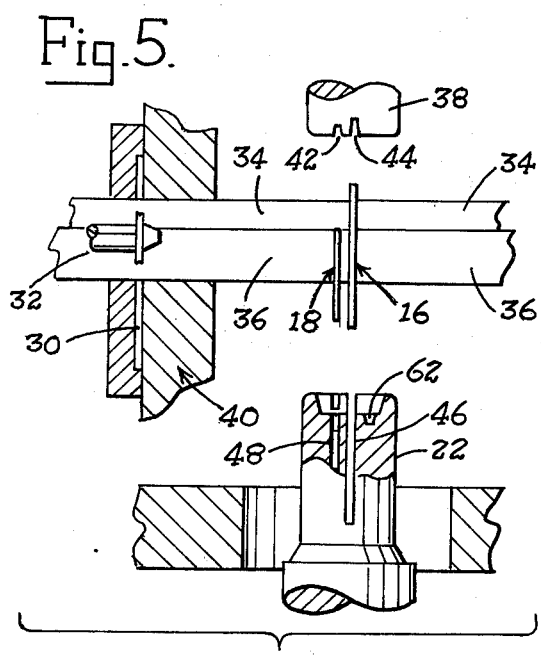
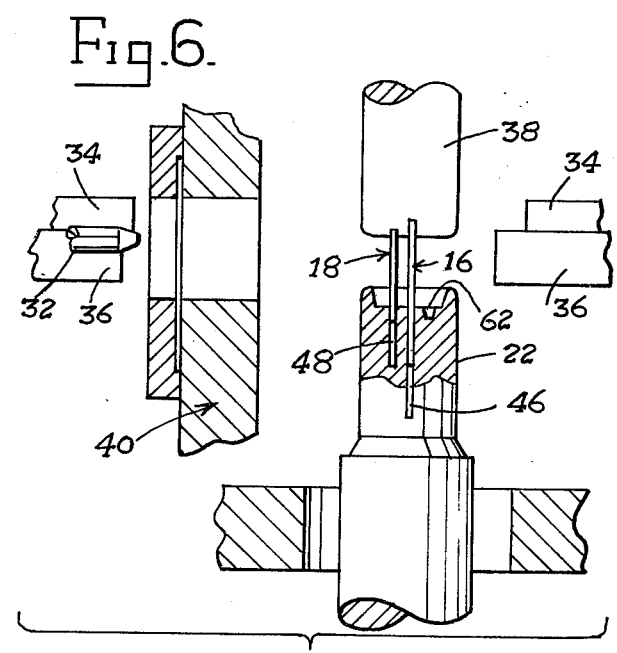
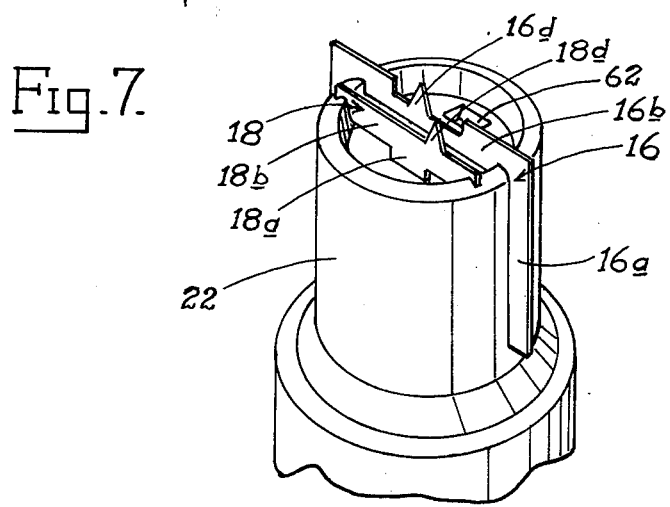

INVENTORS
H.T. BECK
R. KOEHLER
BY Leon Arthurs
AGENT

METHOD OF MOLDING ELECTRICAL LAMP SOCKETS

This invention relates to a method for the manufacture of an electrical socket moulded on and around a pair of electrical conductors for supplying electrical energy to the contact elements in the socket.

It is known from the prior art to mould an electrical lamp socket onto a pair of electrical conductors and, after the moulding stage, to insert a pair of electrical contact elements into the socket to make electrical connection with the respective conductors; the said contact elements being engageable by an electrical device, such as, for example, a light bulb, when such device is located within the socket.

It is an object of the invention to provide a process for the moulding of an electrical socket onto a pair of electrical conductors wherein electrical contacts, intended for subsequent electrical contact with a co-operating electrical device such as a light bulb inserted in the socket, are installed in the socket in electrical connection with the respective said electrical conductors in the course of the moulding of the socket.

It is a further object of the invention to provide such a process wherein said pair of contacts are supported in predetermined spaced-apart relation prior to and during the effecting of electrical connection with said conductors and are retained in said relation during the moulding of said socket.

It is a further object to provide such a process wherein the socket is moulded to co-operate with said contacts and maintain them firmly in electrical connection with their respective conductors.

It is a still further object to provide such a process wherein said contacts are retained within the socket against displacement relative to the respective electrical conductors with which they are in electrical connection.

It is a yet further object to provide an improved method for forming electric contacts as aforesaid for installation in the socket during the moulding thereof.

In accordance with the invention, there is provided a method of moulding an electrical socket onto a pair of electrical conductors including the steps of effecting electrical connection between a pair of conductors and a pair of contacts and moulding a socket casing around said contacts in spaced-apart relation whilst connected to said conductors as aforesaid.

Further objects of the invention, more or less broad than the foregoing, will become apparent from the following description of the constituent parts, elements and principles of one embodiment of the invention given herein solely by way of example with reference to the accompanying drawings wherein:

FIG. 1 is a top plan mainly diagrammatic view of apparatus for carrying out the invention illustrating four work stations spaced circumferentially around a transfer turntable;

FIG. 2 is a mainly diagrammatic side elevation of the apparatus shown in FIG. 1 showing two of the work stations together with associated work supporting posts carried by the turntable;

FIGS. 3 to 6 are side cross-sectional views of separating apparatus employed at the first work station and showing the sequence of operations for mounting two contact elements upon a support post;

FIG. 7 is a top perspective view of a support post with the two contact elements mounted thereon;

Figure 8:
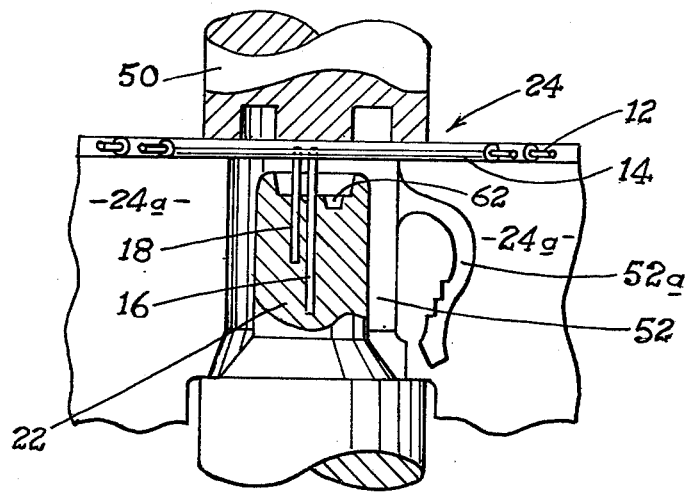
FIG. 8 is a side cross-sectional view of a moulding cavity employed at the third work station for moulding an electric socket about the contact elements and conductors.

The invention broadly contemplates the provision of method and apparatus for the moulding of an electrical socket 10 on and about a pair of mutually insulated conductive wires 12 and 14 wherein a pair of electrical contact elements 16 and 18 are installed in electrical connection with respective ones of said conductive wires in the course of the moulding operation. To this end, the apparatus includes means for delivering a pair of mutually insulated wires to a moulding station, means at said station for supporting a pair of electric contact elements in spaced relation, means for bringing each of said contact elements into electrical connection with a respective wire and means for moulding a socket casing about said wires and contact elements.

The apparatus also includes other detailed features, which will be more fully described herein, and also includes means for forming the contact elements 16 and 18 from a ribbon of prestamped metal.

In the embodiment described and illustrated herein, the apparatus includes transfer mechanism indexed to move sequentially through a plurality of work stations at each of which an operation is carried out pursuant to the formation of the finished moulded socket. As illustrated herein, there is visualized a loading station A at which the paired contacts 16 and 18 are separated from a connected series 20 of such elements and they are then located in spaced-apart relation upon post-like support 22 for transport to a moulding position. En route thereto, the support 22 carrying the contacts 16 and 18 passes a second station B at which it is sensed to verify the presence and positioning of the contacts 16 and 18. At the next station C, which is the moulding station, the support 22 bearing the contacts 16 and 18 is assembled with other parts to form a mould 24 in which the socket 10 is moulded about the contacts and electrical conductors after they have been brought into electrical connection with each other, such connection conveniently being effected at this third station C. Upon completion of the moulding operation, mould 24 is re-opened, freeing the completed socket 10 for transport to a location at which it is subjected to an electrical test; the support 22 returning meanwhile to station A via a fourth station D at which it is sensed to verify that it is duly cleared for reloading with a second pair of contacts 16–18 at said loading station A.

The support 22 is located on and moved between said stations A, B, C and D by transfer mechanism comprising, in this instance, a generally circular turntable 26 mounted for rotation in a horizontal plane and in 90° steps about a central vertical axis 28; each said step representing one of the four work stations referred to above. It will, of course, be understood that four identical supports 22 are provided at circumferentially spaced-apart positions on turntable 26; each being sequentially and cyclically transported thereby through each of said work stations.

Each such support 22 is disposed peripherally of turntable 26 and projects perpendicularly from the upper surface thereof for axial movement relative thereto. Each said post 22 is suitably recessed at its projecting end for receiving the aforesaid side and centre contact elements 16 and 18 respectively thereon as will be further described whilst the other end of each post 22 disposed below the turntable 26, is associated with driving means, such as fluid pressure motors 23, for procuring axial movement of the post 22 as aforesaid.

For the purpose of clarity, it is now deemed convenient to describe the full sequence of operations leading to the formation of the finally moulded socket 10 with the electrical contact elements 16 and 18 installed therein starting from the first work station A at which the contact elements are separated out of a connected series 20 of such elements as follows.

The paired contact elements 16 and 18 in this embodiment are formed serially in a pre-stamped ribbon 20 of electrically conductive, and at least slightly resilient, material such as brass to provide respective side and centre contacts for the socket for electrical engagement by a screw cap and centre pole respectively of an electrical device such as, for example, an electric lamp installable in said socket 10.

Said pre-stamped ribbon 20 is comprised of a series of interconnected assemblies of joined together contact elements 16 and 18. In this example, the side contact element 16 is generally U-shaped and specifically comprises two parallel limbs 16a—16a integrally interconnected together in spaced relation by a bridging member 16b. The centre contact element 18 is of generally T-shaped form having a stem 18a extending from a transverse head 18b which, in ribbon 20, also links the parallel limbs 16a—16a of the side contact element 16.

Optionally, in the ribbon 20, each said assembly of contact elements 16–18 is contained in a frame 30 comprised of strips 30a—30a included in the lateral edges of ribbon 20 which are joined between adjacent contact assemblies by a third strip, the divider 30b having an intermediate enlargement 30c with a centre hole 30d which, in the ribbon 20, joins the limb 16a of one side contact element 16 to the proximal limb 16a in the neighbouring contact assembly as best shown in FIGS. 2 and 3.

The U-shaped side contact 16 is further formed with serrations or teeth 16c along the mutually facing edges of its limbs 16a whilst the bridge 16b thereof is provided on its exterior edge with a triangular point 16d. The T-shaped centre contact 18 is also provided with a triangular point 18 on its head 18b extending in the opposite direction to the stem 18a thereof whilst the stem itself is necked at 18c intermediate its ends as shown; the purpose of these features becoming apparent from the hereinafter following description.

As stated above, means, such as a press P located at the first work station A, is provided for separating the side and centre contact elements 16 and 18 respectively from the ribbon 20 and for locating the thus separated elements in suitably spaced-apart relation upon a support post 22 of the transfer turntable 26.

The means at said work station A for separating and locating the contact elements 16–18 as aforesaid is of fairly common design which does not constitute a significant part of the invention and hence need not be described in detail herein. Generally, however, it is comprised of means for releasably engaging the ribbon 20 at suitable intervals, and mechanism for actually severing the said contact elements 16–18 from the ribbon 20 and from each other.

Referring to FIGS. 1–3 of the drawings, it will be seen that the ribbon 20 is first fed to the engaging means aforesaid and supported thereon for transfer to the actual severing mechanism in a substantially horizontal direction but with the plane of the ribbon 20 substantially vertical. Furthermore, the ribbon 20 is so oriented that the aforesaid points 16d and 18d of the respective contacts 16 and 18 are disposed with their apices pointing upwardly of the ribbon 20.

In the severing mechanism proper, the aforesaid two contacts 16 and 18 in each successive units of the ribbon 20 are pressed out of their connecting frames 30 and displaced laterally relative to one another for location upon a support post 22 of the turntable 26 at said station A. After such an operation, the post 22 with the contact elements 16 and 18 carried thereon is then advanced to the next work station B whilst the ribbon 20 is advanced one step through the separating apparatus to enable the next successive pair of contact elements to be mounted upon the post 22 which is next brought by turntable 26 to work station A.

As mentioned earlier, each unit in the continuous ribbon 20 is formed with a pair of holes 30d in a respective pair of plate elements 30c on the connecting frames 30 on either side of a said unit. These holes 30d are provided for location purposes to enable that unit of the ribbon 20 whose contacts are to be separated therefrom to be positioned relative to the severing mechanism proper prior to and during the actual separating operation. Such location may conveniently be carried out by a pair of retractable fingers 32—32 (see FIGS. 3–6) associated with the separating apparatus and engageable within a corresponding pair of said holes 30d—30d in that unit of the ribbon 20 for the purposes aforesaid.

In one preferred form, the severing mechanism includes two pairs of axially-opposed axially reciprocable punches 34 and 36; each such pair of opposed punches being engageable respectively with the side and centre contact elements 16 and 18 in that unit of the ribbon 20 from which the said elements are to be separated.

Referring to FIGS. 4–6 of the drawings, it will be seen that the two pairs of punches 34 and 36 are mounted respectively one above the other; both being located above the upper end of the support post 22 at said work station A. The severing mechanism also includes a locating plunger 38 mounted for axially reciprocable vertical movement above the level of the two pairs of punches 34 and 36 and co-axially with the support post 22 at station A.

As stated hereinbefore, the continuous ribbon 20 is fed into the press P with the plane of the ribbon substantially vertical and the pointed elements with the apices of contact points 16d and 18d having their apices pointing upwardly of the ribbon 20. Initially, the two pairs of punches 34 and 36 are separated to define a narrow gap between each punch 34—34 and 36—36 of a respective pair, with the two gaps being in linear alignment one with another. The ribbon 20 is then fed between these two aligned gaps and both pairs of punches 34 and 36 are actuated to grip the respective contact elements 16 and 18; the upper pair of punches 34 gripping the side contact 16 and the lower pair of punches 36 gripping the centre contact 18 (see FIG. 4).

It should be understood that, when the ribbon 20 is gripped between the two pairs of punches 34 and 36 at the position shown in FIG. 4, the holes 30d—30d in the plate elements 30c—30c of the surrounding frame 30 of the said unit are positively located upon the aforesaid pins 32—32 of the separating mechanism. The two contacts 16 and 18 are then severed from the frame 30 either by moving that part of the mechanism 40 which contacts the frame relative to the contacts or, as illustrated herein, by reciprocating both pairs of punches 34 and 36 relative to the frame locating means 40. After severing, the lower pair of punches 36 is then displaced longitudinally relative to the upper pair 34 so that the centre contact element 18 is displaced laterally of the side contact element 16 in such manner that the planes containing the two contact elements 16 and 18 are then located in a parallel offset orientation relative to one another with the plane of the side contact element 18 containing the longitudinal axis of the support post 22 therebelow (see FIG. 5).

The aforesaid locating plunger 38 is formed with a plane end having two recesses 42 and 44 formed therein, the recess 44 being approximately twice as deep as the recess 42. The deeper recess 44 is adapted to engage with the point 16d and bridge piece 16b of the side contact 16 whilst the shallower recess 42 is adapted to engage with the head 18b and point 18d of the centre contact element 18. Initial downward actuation of this plunger 38 towards the punches 34 and 36 with concurrent longitudinal separation thereof enables said plunger 38 to positively engage the contact elements 16 and 18 whilst further downward movement of the plunger 38 will press the separated and laterally offset contacts downward towards the associated support post 22.

Each support post 22 itself is a substantially cylindrical member with a plane outer surface end two diametrically-opposed shallow slots 46 in its outer surface to receive the limbs 16a of the side contact 16 and with an elongated slot 48 extending axially from its end surface to receive the centre contact stem 18a. Axially upward movement of that support post 22 located at work station A relative to the turntable 26 concurrent with the downward movement of the locating plunger 38 enables the two contacts 16 and 18 to be mounted upon the support post 22 with the limbs 16a—16a of the side contact element 16 engaged within said shallow slots 46—46 of the support post 22 and the centre contact 18 engaged within the elongated slot 48 as shown in FIG. 6. Both the locating plunger 38 and the support post 22 are then retracted relative to one another and the turntable 26 is indexed to move through 90° bringing the support post 22 with the contacts 16 and 18 mounted thereon to the next work station B whilst freeing the separating mechanism proper at the first work station A preliminary to the next cycle of operations, i.e.: separating a further pair of contacts from the ribbon 20 and mounting them upon a next succeeding support post 22.

As mentioned hereinbefore, the second work station B includes means for sensing and confirming the presence, or absence, of each of the contacts 16 and 18 upon the support post 22 of the turntable 26. Such sensing operation may conveniently be carried out by a photoelectric detector or, alternatively, by establishing a closed electrical circuit through the said contact elements 16 and 18 in a known manner. If the sensing operation confirms the presence of both contact elements, the turntable 26 is then allowed to move the post 22 and contacts 16 and 18 mounted thereon to the third work station C. Alternatively, if for some reason one or both of the contacts prove absent from the post 22, this may be signalled and an appropriate action initiated such as, for example, the prevention of further advancement of the turntable 26 pending manual mounting of the missing contact element or elements upon the support post 22 or passing a signal to the third work station C to render it inoperative pending the arrival at said station of a correctly loaded support post 22.

The third work station C is that at which the socket 10 is moulded on and around a pair of mutually insulated conductors 12 and 14 in which the contacts 16 and 18 are installed in electrical connection respectively with a said conductor.

The socket mould 24 is comprised of conventionally separable mould halves 24a–24b located at station C; a support 22 which is elevatable in turntable 26 to fit as a core between the assembled mould halves 24a–24b, and a plunger 50 which is movable downwardly to engage said assembled mould halves and seal the resultant cavity 52, the plunger 50 being co-axial with support 22; all as will appear from a study of FIGS. 1, 2 and 8 of the drawing.

It need hardly be stated that the above enumerated parts are suitably actuated to assemble in the manner described to form mould 24 each time a support 22 reaches station C and to disassemble after a suitable interval to release the socket 10 moulded in said mould 24.

The invention also includes means for training the aforesaid paired and mutually insulated wires 12 and 14 more or less diametrically across the top of the mould halves 24a–24b through suitable channels formed therein below plunger 50 so that, when the mould halves 24a–24b are closed together, the support post 22 carrying the contacts 16 and 18 is moved upwardly and the plunger 50 moved downwardly, the said mutually insulated wires 12 and 14 will be clamped between the support 22 and plunger 50 at a location corresponding, in the finally moulded form of the socket 10, to the base 54 thereof (see FIGS. 8–10).

The initial relative movement towards one another of the support post 22 and the plunger 50 presses the conductive wires 12 and 14 onto the points 16d and 18d of the respective contacts 16 and 18 causing them to penetrate the insulated covering of the wires 12 and 14 and make electrical connection with the conductive cores thereof. It will, of course, be understood that the wires 12 and 14 are led through the moulding station C so oriented (see FIGS. 1, 2 and 8) as to be respectively engageable by the pointed elements 16d and 18d of the respective contacts 16 and 18 carried by the support post 22.

Referring to the drawings, it will be observed that the two mould halves 24a–24b close laterally together about the electric conductors 12 and 14 which pass diametrically through the mould; the joint line of the mould thereby being parallel to the line of the conductors. The mould halves 24a–24b may be further formed to define a cavity 52a for moulding a clip 56 integrally with the socket 10; the joint line of the mould halves also passing centrally through the clip moulding cavity 52a so that, in the finally moulded form of the socket 10, the clip 56 will project from the socket casing in a plane parallel to the line of the conductors 12 and 14 (see FIGS. 1, 9 and 10).

Thus, when all the respective parts of the mould 24 are closed together, the respective contacts 16 and 18 are brought into electrical connection with the respective conductors 12 and 14 and a charge of moulding material is injected into the mould cavity. Such moulding material conveniently comprises a suitable plastic such as, for example, polypropylene which flows into the mould cavity 52 defined by the mould halves 24a–24b, the support post 22 and plunger 50 so as to completely surround both the bridge piece 16b of the side contact 16 and the head 18b of the centre contact 18 of the socket.

Figure 10:
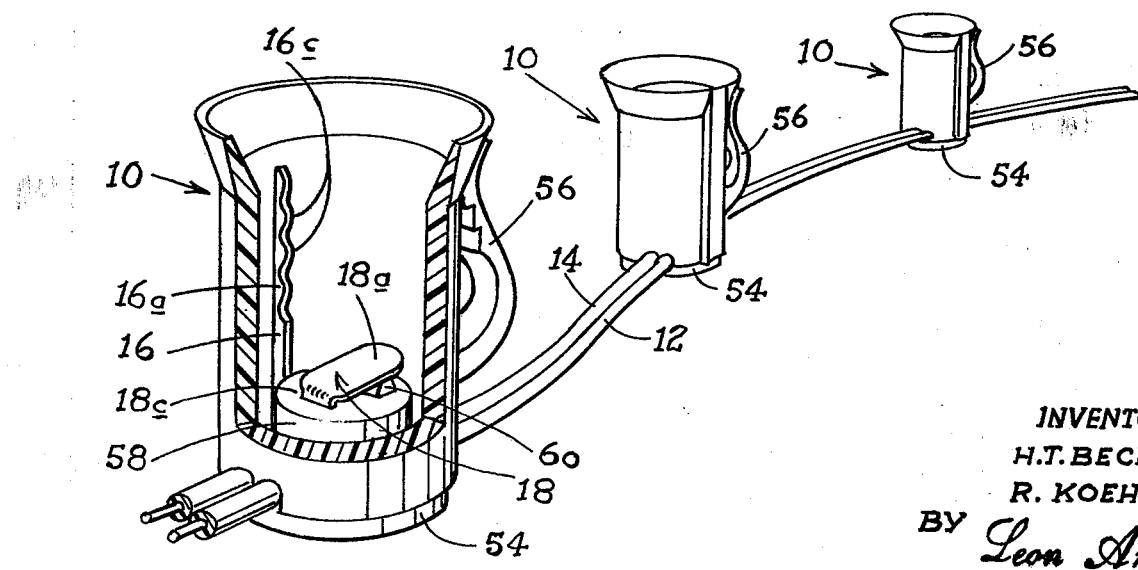
FIG. 10 is a part cut-away perspective view of a plurality of moulded sockets in their finally moulded form as they leave the fourth work station.

After the moulding material has cured, the support post 22 and plunger 50 are retracted, the respective parts of the mould 24 are opened, and the turntable 26 is advanced to bring the moulded socket 10 with its conductive wires 12 and 14 moulded therein to the check station E (FIG. 1) for electrical testing at which time a next following socket may then be moulded at the preceding work station C upon the conductive wires 12 and 14 whereby a series of spaced-apart sockets may be moulded upon the wires and connected thereto in electrical parallelism as indicated in FIGS. 1 and 10.

While said station E is utilized primarily for carrying out an electrical test upon the moulded socket 10 to verify that correct electrical connection has been established between the contacts 16 and 18 and the respective electrical conductors 12 and 14, a final forming operation may also be completed at this point. It will be appreciated, that immediately following moulding of socket 10, its centre contact 18 will project axially from base 56 as shown in FIG. 9 and it is hence necessary, at this station E, to bend the said centre contact 18 at its necked portion 18c to lay it closely parallel to the base 54 of the socket so as to be engageable by the pole of, for example, an electric light bulb.

While the final forming operation aforesaid is being carried out and the electrical connections being verified, the moulded socket 10 having been removed from the support post 22 of the turntable at station C, the said post 22 is then advanced to station D for a clearance check and thereafter on to the aforesaid first work station A to receive another pair of contacts preliminary to the reinstitution of the whole cycle of operations aforesaid.

Figure 9:
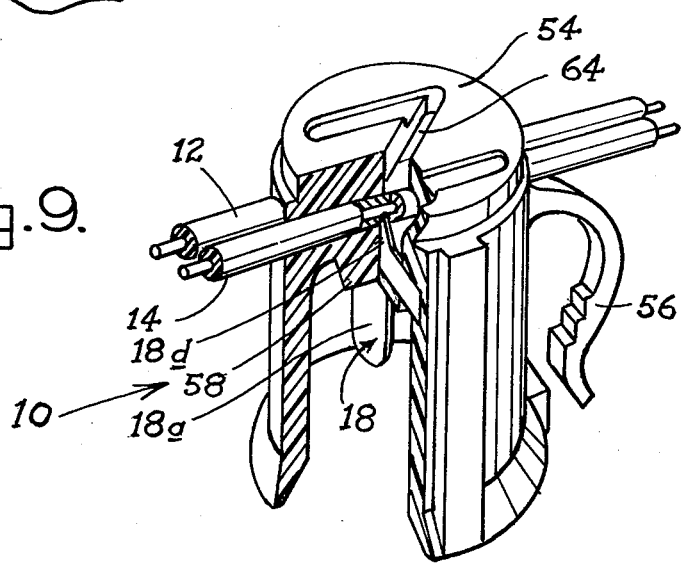
FIG. 9 is a top part cut-away perspective view of a socket on the conductors after moulding at the third work station.

Referring now to FIGS. 9 and 10 of the drawings which show the moulded socket 10 mounted upon the paired wires 12 and 14, it will be observed that, whereas the exterior surface of the base 54 of the socket casing is relatively plane, the interior surface comprises an upstanding central circular boss 58. Such boss 58 is, of course, formed during the moulding operation at the third work station C and the shape thereof is determined by the mutual co-operation between the upper surface of the support post 22 and the laterally closeable mould halves 24a–24b (see FIGS. 3–8). It will also be noted that there is provided a small moulded support bridge or platform 60 adjacent one side of the boss, such platform 60 being moulded by means of a suitable moulding recess 62 formed in the upper surface of the turntable support post 22. It will be appreciated that, since the centre contact 18 is relatively resilient to accommodate good electrical connection with the centre pole of a screw-capped electrical element as aforesaid, the stem 18a of the centre contact, bent over about its necked portion 18c at the fourth work station E is propped in slightly elevated position by said platform 60 and hence prevented from being depressed too far towards the base 54 of the socket 10.

It will also be noted (see FIG. 9) that the exterior surface of socket base 54 has diametrically-extending slot 64 moulded therein by said axially movable plunger 50 which cooperates with the support post 22 to effect the electrical connection between the contacts 16 and 18 and the respective conductive wires 12 and 14. Such slot 64 corresponds to the shape of the under-surface of the aforesaid plunger 50 (see FIG. 8) whereby firm pressure may be applied and maintained during the moulding operation between the plunger 50, the conductors 12–14 and the contacts 16–18 on support post 22.

Thus, there has been provided a method of moulding an integral electric socket 10 on and about a pair of mutually insulated conductive wires 12 and 14 and including two contacts 16 and 18 engageable by, for example, an electric light bulb, and wherein said contacts are actually installed in the socket during the moulding operation in electrical connection with the respective wires and are firmly retained against displacement relative to said wires and the socket. As will be appreciated, such method of moulding has included the feature of retaining the contacts 16–18 in spaced-apart relation, and in electrical connection with their respective conductors 12–14, during the actual injection of moulding material into the mould cavity whereby the socket casing may be produced accurately and simply. At the same time the feature of firm embedment of the contacts 16–18 within the socket material is facilitated, as hereinbefore described, by flowing the moulding material within mould 24 around both the bridge piece 16b of contact 16 and head 18b of contact 18. Such parts 16b and 18b thus function in the manner of keying formations on their respective contacts 16 and 18 to positively retain said contacts against displacement in the moulded socket after it has set.

In the present embodiment, the contacts are shown as suitable for engagement by the centre pole and screw cap respectively of a screw-capped electric element such as an electric light bulb but it should be appreciated that other suitable forms of contact may be provided if desired; further details of the socket itself being more fully described in our co-pending U.S. patent application Ser. No. 824,816 filed on May 15th, 1969, now U.S. Pat. No. 3,597,725.

Whilst the foregoing embodiment has been described with reference to the moulding of one socket casing at a moulding station, it will be apparent to those skilled in the art that, by suitable modification, it would be possible to mould more than one socket at the moulding station whereby an increased rate of output and economy in production may be effected.

What we claim is:

1. A method of molding lamp sockets onto paired insulated conductors comprising the steps of:
    a. assembling at a first work station a pair of pointed electrical lamp contacts on a core member, said contacts being in spaced relation and having their points exposed, with margins of said contacts, when so assembled on said core, extending from said core,
    b. transferring said core member with said contacts thereon to a molding station.

c. orienting in said molding station said pair of insulated conductors in a position to be penetrated by the contact points,
d. assembling said core and a plunger with other mold parts at said molding station to form a mold cavity into which said core projects and which is subsequently sealed by said plunger,
e. applying pressure to said contact points and conductors between said core and plunger to cause penetration of said contact points through the insulation of said conductors to establish electrical contact therewith, and
f. injecting molding material into said cavity to form said socket while pressure is maintained on said conductors, said conductors and said margins of said contacts being imbedded in said molding material.

2. The method of claim 1 further including the steps: of successively repeating the said cycle to mold a plurality of sockets on said paired conductors; the mold being disassembled, the previously molded socket removed therefrom and a new zone of said paired conductors trained over the said contact points between successive cycles.

3. The method of claim 2 further including the steps of removing the said mold core and replacing it with another between successive cycles.

4. The method of claim 3 wherein a plurality of cores are cyclically loaded and transferred as aforesaid.

* * * * *